United States Patent
Campbell

(10) Patent No.: US 7,767,097 B1
(45) Date of Patent: Aug. 3, 2010

(54) OZONATED CAPACITIVE DEIONIZATION PROCESS & PRODUCT WATER

(76) Inventor: Robert L. Campbell, 15009 Rio Cir., Rancho Murietta, CA (US) 95683

(*) Notice: Subject to any disclaimer, the term of this patent is extended or adjusted under 35 U.S.C. 154(b) by 0 days.

(21) Appl. No.: 12/454,010

(22) Filed: May 12, 2009

(51) Int. Cl.
*C02F 1/78* (2006.01)

(52) U.S. Cl. ............... 210/760; 210/748.01; 210/747; 210/615; 209/166

(58) Field of Classification Search .......... 210/748, 210/760, 747, 615, 748.01–748.1; 209/166
See application file for complete search history.

(56) References Cited

U.S. PATENT DOCUMENTS 4,276,155 A * 6/1981 Roeschlaub et al. ......... 209/10
6,929,753 B1 * 8/2005 Falcon ........................ 210/760
2002/0170858 A1 * 11/2002 Maddux et al. ............. 210/615
2004/0174657 A1 * 9/2004 Andelman et al. .......... 361/503

* cited by examiner

*Primary Examiner*—Walter D Griffin
*Assistant Examiner*—Cameron J Allen
(74) *Attorney, Agent, or Firm*—Mark C. Jacobs

(57) ABSTRACT

Water from coal bed methane production which is suitable for almost nothing, is ozonated in a reactor to oxidize the iron content from +2 to +3, that is from ferrous to ferric, and to oxidize the manganese content from +2 to +4. The water after such first treatment is run through a separation means and then through a rotating filter, and then subjected to capacitive deionization, to yield clean water, which is then treated further to adjust he sodium content to render the water suitable for domestic and agricultural purposes. Some of the produced water is run back through the capacitive deionization cells when no voltage is applied to clean the cells for the next voltage application cycle. Some of the water produced may also be run back through the separation means to help clean out the crud.

7 Claims, 3 Drawing Sheets

OZONATED CAPACITIVE DEIONIZATION PROCESS & PRODUCT WATER

FIELD OF INVENTION

This patent pertains to a process for ozonating and deionizing a specific source of water to yield potable water for drinking and agricultural purposes.

BACKGROUND OF THE INVENTION

Capacitive DEIONIZATION is not new, yet it has not had a huge commercial success due to the high cost of implementation. Another reason for the lack of commercial success is the historical problem of contamination of capacitive deionization units by organic compounds and high ionic loads both of which are alleviated by the ozonation and separation steps prior to the capacitive deionization. When these problems are eliminated, one obtains longer useful life for the equipment, reduced power consumption, and faster regeneration of the CD unit. The grandfather patent in the field is Farmer, U.S. Pat. No. 5,425,858 issued Jun. 20, 1995 to Joseph Farmer of Lawrence Livermore Laboratory, which patent is assigned to the Regents of the University of California. It is titled "Method and apparatus for capacitive deionization, electrochemical purification and regeneration of electrodes."

It is well known throughout California and other parts of the western USA that obtaining reliable and plentiful supply of clean water is becoming more and more difficult, especially in, view of the recent drought years of 2006 and 2007 winters. Not only in the USA but in Africa, Australia and the middle east, there are huge water availability problems. For this reason Israel a little country has become a big player in the water desalination industry.

CDT Systems of Dallas Tex. has licensed the aforementioned Farmer patent as well as other Lawrence Livermore patents pertaining to the impregnation of a carbon paper support with a water-resorcinol-formaldehyde solution, and then polymerizing the resorcinol formaldehyde resin, extracting the water, and then heating the polymerized resin/paper structure to convert the resin to a micro porous carbon aerogel supported on the paper. While the original process was and still remains costly, CDT has achieved significant reductions in cost to permit wider adoption of the capacitive deionization process using carbon aerogels in specialized situations.

It is also known to the art that high sodium ion content is detrimental to agriculture. The NaCl content when high affects the permeability of the soil by rain or other irrigation water. Sodium when present in soil tends to replace calcium and magnesium according to the periodic table from the soil and the sodium causes dispersion of soil particles thus reducing the ease of cultivation and permeability of the soil to permit moisture to seep down to plant roots. The soil becomes hard and compact. Other known problems caused by excess sodium in irrigation water include formation of crusted seed beds, short term saturation of the surface soil, while water fails to sink down to root hairs. The pH goes up and this may be bothersome or evenly deadly to some plants.

In the USA, Australia and England and other countries, there is much coal produced, most of which is used for power generation. Coal bed methane exists in areas where the dominant chemistry of the water in a coal seam is sodium bicarbonate and where the coal seam is buried deeply enough to maintain sufficient water pressure to hold the gas in place. Since Coal Bed Methane hereinafter CBM travels with ground water in coal seams, extraction of CBM for commercial use involves pumping available water from the seam in order to reduce the water pressure that holds gas in the seam. CBM has very low solubility in water and readily separates as pressure decreases, allowing it to be piped out of the well separately from the water. Water moving from the coal seam to the well bore encourages gas migration toward the well. But the capture of this methane gas creates a lot of water that is unsuitable for agriculture or other domestic uses. This water which is known as coal bed methane gas water, is also known by the term, PRODUCED WATER, and it must be purified before it can used. CBM water also contains a high amount of salinity, and since people don't like the taste of salt water, even if the water is pure from microbes and other toxics, the salt content must be reduced or eliminated. Not only is the high sodium content a taste problem, it is also a health problem when ingested in large quantities. Salt water's only domestic use is as a gargle, for sore throats But this is more than a taste issue, it is a health issue. Soil destruction also takes place due to the SAR effect.

But why is this purified high salinity water unsuitable for agricultural purposes?

Salinity becomes a problem when enough salts accumulate in the root zone to negatively affect plant growth. Excess salts in the root zone hinder plant roots from withdrawing water from surrounding soil. This lowers the amount of water available to the plant, regardless of the amount of water actually in the root zone. For example, when plant growth is compared in two identical soils with the same moisture levels, one soil receiving salty water and the other receiving salt-free water, plants are able to use more water from the soil receiving salt-free water. Although the water is not held tighter to the soil in saline environments, the presence of salt in the water causes plants to exert more energy extracting water from the soil. The main point is that excess salinity in soil water can decrease plant available water and cause plant stress.

One very specific application of the process of this invention relates to the generation of water suitable for both domestic and agricultural purposes from coal bed methane gas water by a specialized form of capacitive deionization followed by possible further treatment to reduce the salinity. Not only is the water ultimately produced by this process suitable for agriculture but it is suitable for human consumption as well.

SUMMARY OF THE INVENTION

Coal bed methane [CBM] containing water, which is suitable for almost nothing as produced from coal seams as a result of CBM extraction, is collected, is then ozonated in a reactor to reduce organic content, oxidize the iron content from +2 to +3, that is ferrous to ferric, and to oxidize the manganese content from +2 to +4, that is manganous to manganic. The water after such first treatment, which still contains dissolved sodium and other ions is run through a reactor/separator, then through a filtration step, and then is subjected to capacitive deionization, to yield clean water, which then may be treated further to adjust the sodium content to render the water suitable for domestic and agricultural purposes. For economic reasons, it is suggested that the water purification system of this invention be operated near the CBM extraction facility.

It is an object therefore to provide a process for ozonating coal bed methane produced water.

It is a second object to provide a mode of treating water formerly having a content of Fe and manganese in their higher oxidation states, separated and filtered, prior to being subjected to capacitive deionization.

It is a third object to adjust the salt content, IE. the NaCl content to render such water potable and suitable for agriculture.

Other objects of the invention will in part be obvious and will in part appear hereinafter.

The invention accordingly comprises the process possessing the series of steps, and combination of elements, as well as the product of the process, all of which are exemplified in the following detailed disclosure, and the scope of the application of which will be indicated in the claims.

DESCRIPTION OF THE PREFERRED EMBODIMENT

Figure 1:
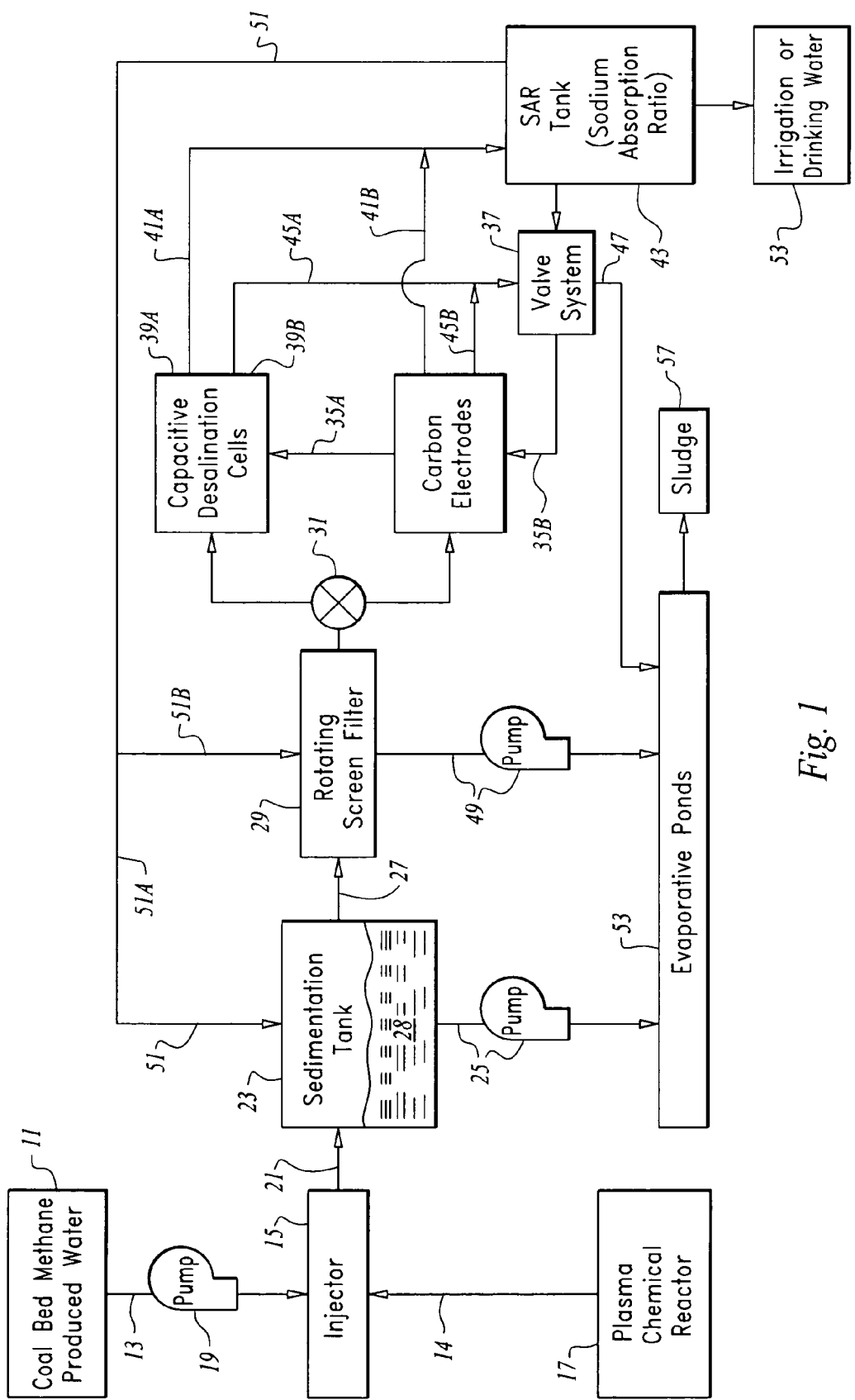
FIG. 1 is a operations diagram of the process of this invention.
Figure 2:
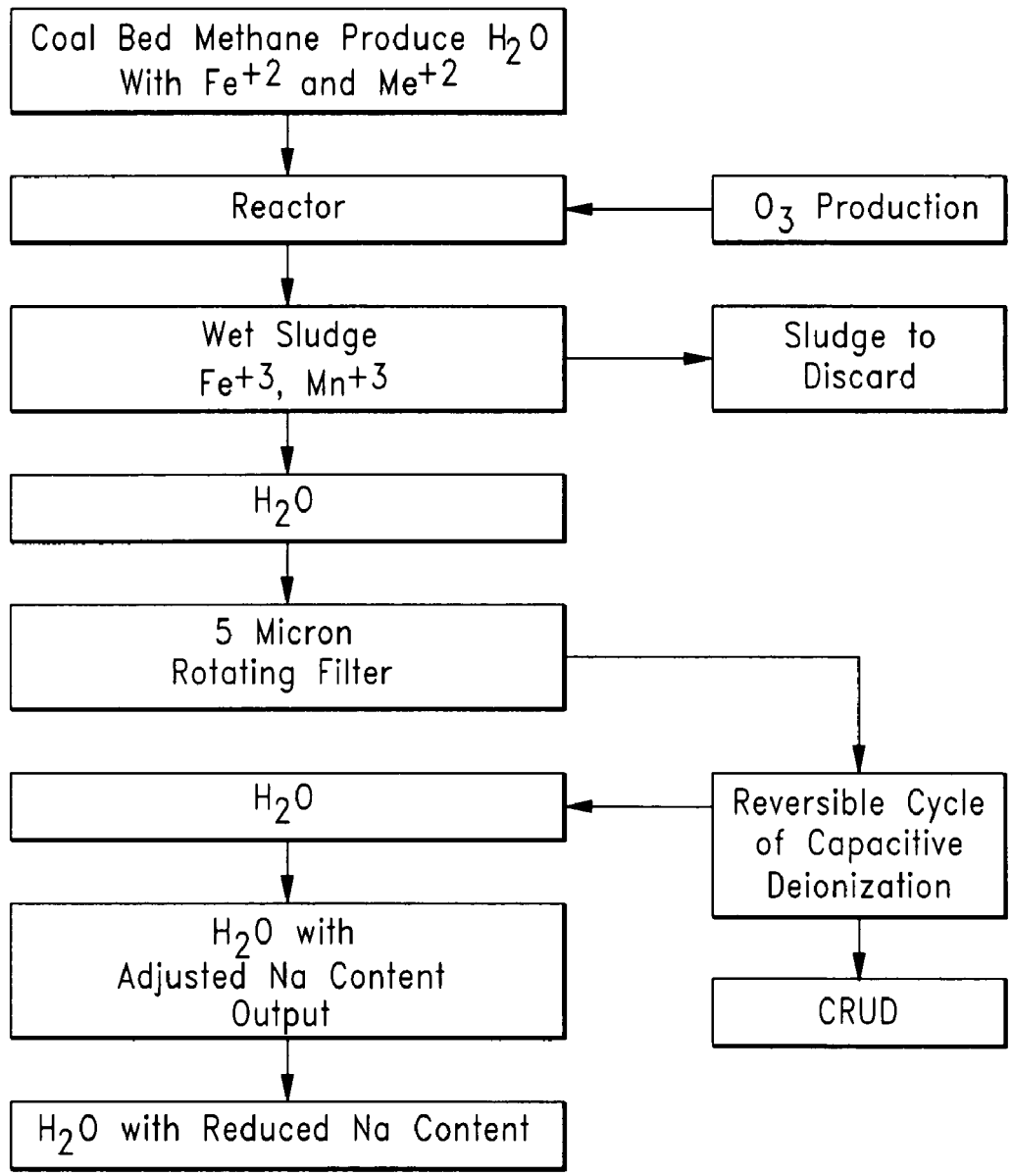
FIG. 2 is a simplified black box diagram of the process of the invention.

The discussion commences at FIG. 1. Coal Bed Methane produced water, 11 from any coal mine, which normally would be deemed a hazardous material, is collected, and then transported by pipe 13, and pumped 13 as may be necessary into a Mazzei injector, 15, a multi-patented device made by the Mazzei Injector Company, LLC of Bakersfield, Calif. and the mixture is then delivered to a sedimentation tank 23 or to a Couette reactor/separator 23, for continued simultaneous ozonation and separation of solids. This Coutette reactor technology is believed to be originally patented under auspices of the Oak Ridge National Laboratory, Oak Ridge Tenn.

Injector 15 has an input line 14 from a plasma chemical reactor 17, which may hereinafter be called a PCR. These devices are known to the art from such patents as U.S. Pat. No. 4,013,415 and U.S. Pat. No. 6,846,467 among others. Applicant uses a PCR to generate ozone, which ozone is delivered by pipe 14 to the Mazzei™ injector. In operation the Mazzei injector creates a vacuum to suck the ozone from the plasma chemical reactor. This negates the requirement of having to pump ozone to a reaction zone, as ozone is quite corrosive to piping. In actual operation, the Mazzei injector draws the ozone into a small pipe for mixture with a finite amount of water, the concentrated water-ozone mix is then delivered to the main pipe, usually a 4 inch pipe as opposed to a 1 inch pipe for the initial input. The further diluted ozone-water mix is then delivered to the sedimentation tank or Couette Reactor/separator 23.

While there are other means for delivering ozone from its source of creation, the Mazzei injector creates the most minute micro-bubbles and is therefore the preferred piece of equipment.

Here in the diluted ozone water mix, the Ferrous iron with a valance of plus 2 is oxidized to Ferric iron with a valance of +3. The manganese ion present as Mn+2 is oxidized to the higher manganic ion with a valance of +4. These oxidized ions form dissolved or soluble metallo-organic compounds both stay in solution and for the most part form compounds which can be separated out. While a Plasma Chemical Reactor is the preferred apparatus for ozone generation, any apparatus that generates ozone can be utilized in this reclamation process.

The sedimentation tank, 23, or an equivalent acting apparatus such as a cyclonic separator or a Couette reactor/separator, which ever is used, is generally wider at the top and tapers to a narrower bottom for ease of removal of solids. The separation means 23—used generically here for any of the 3 apparatuses—, has two inputs one from the injector for CBM (coal bed methane) water and one for input from a SAR tank, line 51. Prior to discussing the SAR tank, it should be pointed out that the Couette Reactor/separator allows for the use of a lower quantity of ozone than do the other two separation means. This apparatus offers the advantage of being a continuous reactor with high throughput and is compact and easy to use.

The term SAR will be discussed in further detail infra with respect to the discussion of the SAR tank 53. The tapering downward shape permits mass that accumulates due to gravity to collect in a smaller space, thus rendering it easier to collect. Moist waste product containing ferric oxide and manganic oxide is removed through a port at the bottom of the sedimentation tank and is piped via pipes and pump 25 to a conventional sedimentation pond 53.

A fluid port connected to pipes and pump 27 delivers the water containing dissolved solids to a rotating screen filter 29. Micro-screen rotating drum filters, are an alternative to sand filtration especially when excessive waste water is a concern, as here. The filtering process of these rotating screen filters captures particles on a screen fabric while letting the water pass through. They are designed with few moving parts to ensure long life and low operational costs, with minimal maintenance. One brand of such products known to applicant is Hydrotech®, and another is Orival®.

The captured solids are moved by pipes and pumps 49 from the rotating screen filter 29 to the sedimentation pond 53. Note also that the sedimentation tank 23 also receives fluid from SAR tank 43 via pipe 51,51A to help dilute the water in the sedimentation tank 23, some of which is exiting port 25 with the solid waste. Note further that water from the SAR tank 43 also enters the rotating screen filter via pipe line 51,51B near the egress end. See FIG. 1.

Water exiting the rotating screen filter passes through a gate valve 31 to split the flow to two banks or sets of capacitive desalination cells. Each bank can easily have from 6 to 10 capacitive desalination stations, or even more which alternate between an operation cycle and a cleaning cycle. One such bank is designated 39A and the other 39B in FIG. 1.

Figure 3:
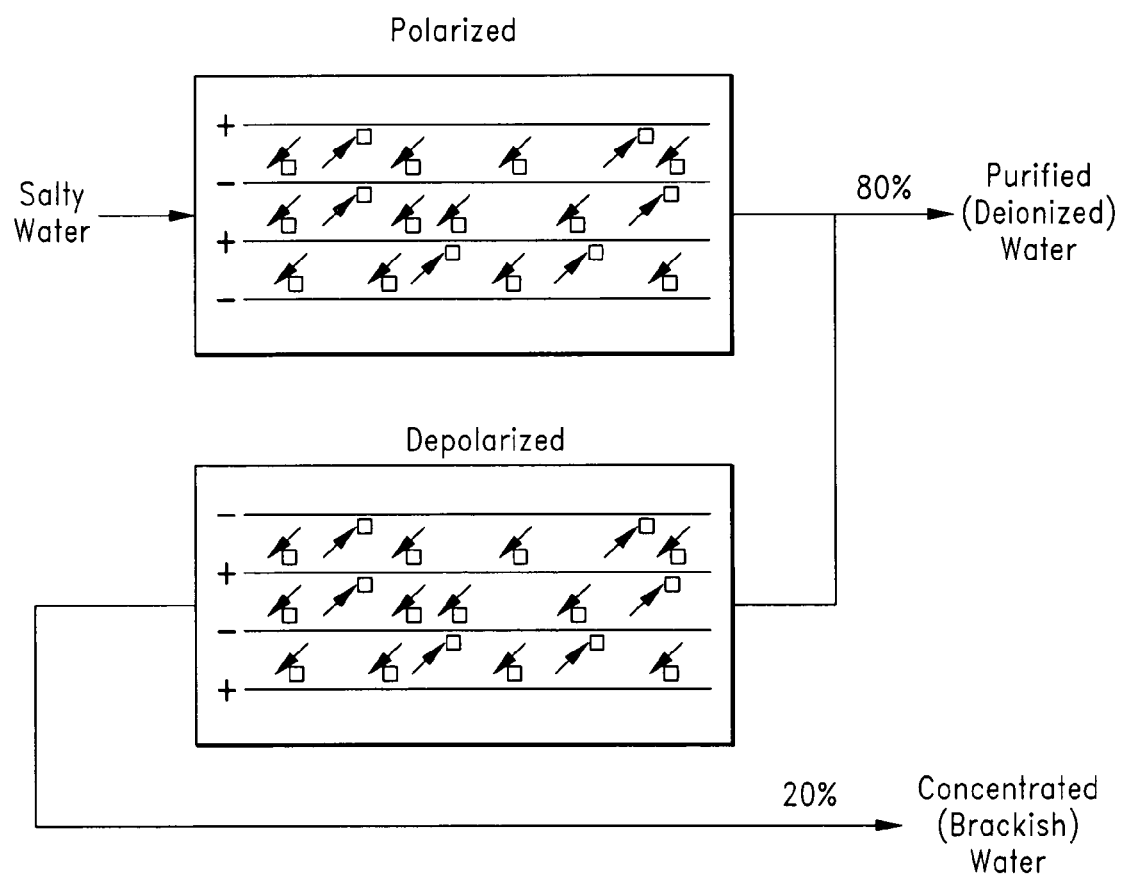
FIG. 3 is a diagram that illustrates the operational principles of a capacitive desalination plant.

Reference is made to FIG. 3 which sets forth the operating principles of this technology. The capacitive desalination technology—(CDT)—works in two half cycles, wherein the pairs of spaced electrodes are first polarized to separate solids from water, and then de-polarized to backwash the collected solids away such that the polarized cycle can commence. In CDT brackish water or other non-potable water is pumped between pairs of high surface area carbon electrodes, such as those called aerogels, which electrodes are held at a potential difference of about 1.3 volts+/−Ions present and other charged particles such as microorganisms bind to and are retained at the electrode of an opposing charge. Thus cations, go to the anode, or negative electrode. Typical ions that can separated in such manner include Ca, Mg, and Na—calcium, magnesium and sodium respectively.

The same concept holds true for anions which are negatively charged. They are attracted to the positive electrode. Typical anions include chloride, nitrate and silicate, and sulfate ions. This attraction half cycle is called the active cycle. The ions stick to the electrode plates and the clarified water passes from the cell. This last activity takes place through pipes and pumps 41A, and 41B to the SAR tank 43.

Part of the exiting water also goes via piping 45A and 45B respectively through valve system 37 back to each cell bank via piping 35B and 35A. See FIG. 1. Fluid from the SAR tank 43 also flows through the same valve system 37 to the respective cell bank via the same piping 35A and 35B.

When and as the electrodes have reached near their capacity in ion content, the applied electrical potential is removed. The ions become unbound from their respective electrodes, and are flushed out of the cell during the depolarization cycle by the incoming water entering via piping 35A, 35B, from both the exudate of the respective cell and from the SAR tank. This concentrated waste product goes back through the valve system 37 to the evaporation pond or other collection location 53. Thus it is seen that the valve system 37 provides both access and egress from the CDT cells.

The discussion now moves to the SAR tank 43 seen in the lower right corner of FIG. 1. In order to make this coal bed methane potable and suitable for agriculture, it is necessary to reduce the sodium ion content dissolved therein. This is because excess sodium in water can cause the crusting of seed beds, temporary saturation of surface soil thus preventing permeation of the water, and the sodium can contribute to increased levels of plant disease, soil erosion, and cause high pH in the soil and water. Fruits, nuts citrus and avocados are especially sensitive to high levels of sodium in the water.

Contrary to popular belief, SAR does NOT stand for sodium anion reduction. Rather it stands for sodium adsorption ratio. It is an expression of relative activity of sodium ions in the exchange reactions with soil. This ratio measures the relative concentration of sodium ion to calcium and magnesium. SAR=Sodium ion content divided by the square root of the sum of Ca ion and Mg ion divided by 2. The SAR tank, includes a packed ion exchange column of calcium carbonate to further reduce the sodium content as the sodium containing water is passed therethrough. The operation of SAR tanks is generally well understood by those skilled in the art.

It is seen from FIG. 1 that the procedure also includes the steps of recycling some of the output from one or both of the at least capacitive desalination cell and some of the output from the S.A.R. tank, back through a valve system into the at least one desalination cell for cell cleaning purposes. Some of the output from the S.A.R. tank can also be sent back to both the sedimentation tank and the filter station, if desired. Again see FIG. 1.

Since certain changes may be made in the above process without departing from the scope of the invention herein involved, it is intended that all matter contained in the above description and shown in the accompanying drawings, shall be interpreted as illustrative only and not in a limiting sense.

I claim:

1. A process for producing pure water for agricultural and domestic purposes from coal bed methane derived water, which process comprises:
   a) delivering coal bed methane—hereinafter CBM production water to a reaction chamber,
   b) introducing ozone into the reaction chamber,
   c) reacting the ozone with the CBM production water, to oxidize metal ions therein,
   d) delivering the ozonated CBM water to a separation means,
   e) filtering the liquid output from the separation means, and removing the oxidized metallic ions and compounds,
   f) filtering the water from the separation means,
   g) delivering the filtered water to at least one capacitive desalination cell for treatment,
   h) activating the at least one desalination cell to produce desalinated water,
   i) delivering the product water from the at least one desalination cell to a S.A.R. tank for further sodium content reduction further including the step of recycling some of the output from the sodium absorption ratio—hereinafter S.A.R. tank back through a valve system into the at least one desalination cell for cell cleaning purposes.

2. The process of claim 1 further including the step of recycling some of the output from both the at least one capacitive desalination cell and some of the output from the S.A.R. tank, back a valve system into the at least one desalination cell for cell cleaning purposes.

3. The process of claim 1 wherein the separation means of step d) is a sedimentation tank.

4. The process of claim 1 wherein the separation means of step d) is a cyclonic separator.

5. The process of claim 1 wherein the separation means of step d) is a Couette reactor/separator.

6. A process for producing pure water for agricultural and domestic purposes from coal bed methane derived water, which process comprises:
   a) delivering CBM production water to a reaction chamber which is a Mazzei injector,
   b) introducing ozone into the reaction chamber,
   c) reacting the ozone with the CBM production water, to oxidize metal ions therein,
   d) delivering the ozonated CBM water to a separation means,
   e) filtering the liquid output from the separation means, and removing the oxidized metallic ions and compounds,
   f) filtering the water from the separation means, wherein the filtering step comprises passing the water from step e) through a rotating screen filter,
   g) delivering the filtered water to at least one capacitive desalination cell for treatment,
   h) activating the at least one desalination cell to produce desalinated water,
   i) delivering the product water from the at least one desalination cell to a S.A.R. tank for further sodium content reduction further including the step of recycling some of the output from the S.A.R. tank back through a valve system into the at least one desalination cell for cell cleaning purposes.

7. The process of claim 6 wherein the separation means of step d) is a Couette reactor/separator.

* * * * *